(12) United States Patent
He et al.

(10) Patent No.: US 10,909,380 B2
(45) Date of Patent: Feb. 2, 2021

(54) METHODS AND APPARATUSES FOR RECOGNIZING VIDEO AND TRAINING, ELECTRONIC DEVICE AND MEDIUM

(71) Applicant: BEIJING SENSETIME TECHNOLOGY DEVELOPMENT CO., LTD, Beijing (CN)

(72) Inventors: Tangcongrui He, Beijing (CN); Hongwei Qin, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 94 days.

(21) Appl. No.: 16/411,342

(22) Filed: May 14, 2019

(65) Prior Publication Data
US 2019/0266409 A1    Aug. 29, 2019

Related U.S. Application Data

(63) Continuation of application No. PCT/CN2018/110500, filed on Oct. 16, 2018.

(30) Foreign Application Priority Data

Dec. 13, 2017   (CN) .......................... 2017 1 1329718

(51) Int. Cl.
*G06K 9/00*     (2006.01)
*G06F 13/00*    (2006.01)
(Continued)

(52) U.S. Cl.
CPC ..... *G06K 9/00744* (2013.01); *G06K 9/00718* (2013.01); *G06K 9/00765* (2013.01);
(Continued)

(58) Field of Classification Search
USPC ....... 382/100, 103, 106–107, 155, 162, 168, 382/173, 181, 219, 224, 232, 254, 174,
(Continued)

(56) References Cited

U.S. PATENT DOCUMENTS

| 8,021,160 B2 | 9/2011 | Chang |
| 9,129,399 B2 | 9/2015 | Jin et al. |

(Continued)

FOREIGN PATENT DOCUMENTS

| CN | 101673404 A | 3/2010 |
| CN | 102014295 A | 4/2011 |

(Continued)

OTHER PUBLICATIONS

Xizhou Zhu et al "Deeo Feature Flow for Video Recognition" arXiv: 1611.07715v2, Publication date Jun. 5, 2017.*

(Continued)

*Primary Examiner* — Seyed H Azarian
(74) *Attorney, Agent, or Firm* — Syncoda LLC; Feng Ma

(57) ABSTRACT

A method and an apparatus for recognizing and training a video, an electronic device and a storage medium include: extracting features of a first key frame in a video; performing fusion on the features of the first key frame and fusion features of a second key frame in the video to obtain fusion features of the first key frame, where a detection sequence of the second key frame in the video precedes that of the first key frame; and performing detection on the first key frame according to the fusion features of the first key frame to obtain an object detection result of the first key frame. Through iterative multi-frame feature fusion, information contained in shared features of these key frames in the video can be enhanced, thereby improving frame recognition accuracy and video recognition efficiency.

20 Claims, 10 Drawing Sheets

(51) Int. Cl.
*G06K 9/62* (2006.01)
*G06T 5/50* (2006.01)

(52) U.S. Cl.
CPC .......... *G06K 9/629* (2013.01); *G06K 9/6256* (2013.01); *G06T 5/50* (2013.01); *G06T 2207/10016* (2013.01); *G06T 2207/20221* (2013.01)

(58) Field of Classification Search
USPC ..... 382/276, 305, 170, 321, 190; 725/40, 41
See application file for complete search history.

(56) References Cited

U.S. PATENT DOCUMENTS

| | | | |
|---|---|---|---|
| 10,540,773 B2* | 1/2020 | Holzer | G06F 16/783 |
| 2008/0020363 A1 | 1/2008 | Chang | |
| 2011/0081082 A1* | 4/2011 | Jiang | G06K 9/00765 382/170 |
| 2015/0082349 A1* | 3/2015 | Ishtiaq | H04N 21/4884 725/40 |
| 2015/0161450 A1 | 6/2015 | Kumar et al. | |
| 2017/0220854 A1* | 8/2017 | Yang | G06K 9/522 |
| 2017/0289624 A1* | 10/2017 | Avila | H04L 65/604 |
| 2018/0182415 A1* | 6/2018 | Dimitriadis | G10L 25/78 |

FOREIGN PATENT DOCUMENTS

| | | |
|---|---|---|
| CN | 102682302 A | 9/2012 |
| CN | 106599907 A | 4/2017 |
| CN | 108229336 A | 6/2018 |
| JP | H07181024 A | 7/1995 |
| JP | 2005123824 A | 5/2005 |
| JP | 2017187954 A | 10/2017 |

OTHER PUBLICATIONS

International Search Report in the international application No. PCT/CN2018/110500, dated Jan. 3, 2019.
Xizhou Zhu, et al. "Deep feature flow for video recognition". arXiv:1611.07715v2, Jun. 5, 2017.
Xizhou Zhu, et al. "Flow-Guided Feature Aggregation for Video Object Detection". arXiv:1703.10025v2, Aug. 18, 2017.
Tangcongrui He, et al. "Impression Network for Video Object Detection". arXiv: 1712.05896v1, Dec. 16, 2017.
First Office Action of the Japanese application No. 2019-553919, dated Oct. 27, 2020.

* cited by examiner

METHODS AND APPARATUSES FOR RECOGNIZING VIDEO AND TRAINING, ELECTRONIC DEVICE AND MEDIUM

CROSS-REFERENCE TO RELATED APPLICATIONS

This application is a continuation of, and claims priority to, International Patent Application No. PCT/CN2018/110500 filed on Oct. 16, 2018, which claims priority to Chinese Patent Application No. 201711329718.5 filed on Dec. 13, 2017. The disclosures of these applications are hereby incorporated by reference in their entirety.

BACKGROUND

Video recognition refers to image content understanding implemented based on a deep learning method, and includes, but is not limited to, pixel-level semantic segmentation, object detection, key point detection and the like. Video recognition has important applications in the fields such as intelligent driving, security monitoring and the like. Video recognition is based on image recognition. However, due to the presence of image frames with motion blur, out of focus and the like in a video, if the recognition technologies for a single image is directly extended to video recognition, they have relatively poor recognition performance and low running speed, and cannot satisfy the requirements of a video recognition task.

SUMMARY

This disclosure relates to computer vision technologies, and in particular, to methods and apparatuses for recognizing a video and training, an electronic device and a storage medium.

Embodiments of this disclosure provide technical solutions for video recognition and technical solutions for video recognition network training.

According to one aspect of the embodiments of this disclosure, a method for recognizing a video provided includes: extracting features of a first key frame in the video; performing fusion on the features of the first key frame and fusion features of a second key frame in the video to obtain fusion features of the first key frame, where a time sequence of detection of the second key frame in the video precedes that of the first key frame; and performing detection on the first key frame according to the fusion features of the first key frame to obtain an object detection result of the first key frame.

According to another aspect of the embodiments of this disclosure, a method for training a video recognition network provided includes: extracting, using a video recognition network, features of a current key frame in a video sample and features of a previous key frame in the video sample; performing, using the video recognition network, fusion on the features of the current key frame and the features of the previous key frame to obtain fusion features of the current key frame, and obtaining an optical flow field between a current target frame in the video sample and the current key frame in the video sample, where the current target frame and the current key frame belong to a same segment of the video sample; obtaining, using the video recognition network, features of the current target frame according to the optical flow field between the current target frame and the current key frame, and the fusion features of the current key frame; performing, using the video recognition network, detection on the current target frame according to the features of the current target frame to obtain an object detection result of the current target frame; and adjusting network parameter values of the video recognition network based on a difference between the object detection result of the current target frame and tag information of the current target frame.

According to yet another aspect of the embodiments of this disclosure, an apparatus for recognizing a video provided includes: a processor; and a memory for storing instructions executable by the processor; wherein execution of the instructions by the processor causes the processor to implement the method of recognizing a video as described above.

According to yet another aspect of the embodiments of this disclosure, an apparatus for training a video recognition network provided includes: a processor; and a memory for storing instructions executable by the processor; wherein execution of the instructions by the processor causes the processor to implement the method for training a video reorganization network as described above.

According to yet another aspect of the embodiments of this disclosure, a non-transitory computer storage medium provided has computer-readable instructions stored thereon, wherein execution of the computer-readable instructions by a processor causes the processor to implement the method as described above.

The following further describes in detail the technical solutions of this disclosure with reference to the accompanying drawings and embodiments.

BRIEF DESCRIPTION OF DRAWINGS

The accompanying drawings constituting a part of the specification are used for describing embodiments of this disclosure and are intended to explain the principles of this disclosure together with the descriptions.

According to the following detailed descriptions, this disclosure can be understood more clearly with reference to the accompanying drawings.

DETAILED DESCRIPTION

Figure 1:
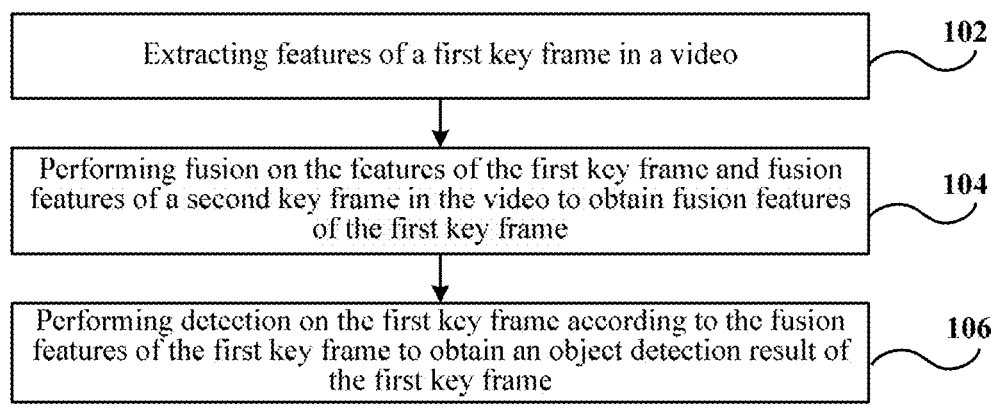
FIG. 1 is a flowchart of a method for recognizing a video according to embodiments of this disclosure.

Various exemplary embodiments of this disclosure are now described in detail with reference to the accompanying drawings. It should be noted that, unless otherwise stated specifically, relative arrangement of the components and operations, the numerical expressions, and the values set forth in the embodiments are not intended to limit the scope of this disclosure.

It should be understood that the terms such as "first" and "second" in the embodiments of the present disclosure are only used for differentiating, and shall not be understood as limitations to the embodiments of the present disclosure.

It should also be understood that, in the present disclosure, "a plurality of" may refer to two or more, and "at least one" may refer to one, two or more.

It should also be understood that, for any component, data or structure mentioned in the present disclosure, if there is no explicit limitation or no opposite motivation is provided in context, it is generally understood that the number of the component, data or structure is one or more.

It should also be understood that, the descriptions of the embodiments in the present disclosure focus on differences between the embodiments, and for same or similar parts in the embodiments, refer to these embodiments. For the purpose of brevity, details are not described again.

In addition, it should be understood that, for ease of description, the size of each part shown in the accompanying drawings is not drawn in actual proportion.

The following descriptions of at least one exemplary embodiment are merely illustrative, and are not intended to limit this disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of this disclosure are applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers are described in the general context of computer system executable instructions (such as, program modules) executed by the computer system. Generally, the program modules may include routines, programs, target programs, assemblies, logics, data structures, and the like, to perform specific tasks or implement specific abstract data types. The computer system/server is practiced in the distributed cloud computing environments in which tasks are performed by remote processing devices that are linked through a communications network. In the distributed computing environments, program modules are located in local or remote computing system storage media including storage devices.

FIG. 1 is a flowchart of a method for recognizing a video according to embodiments of this disclosure. According to one or more embodiments of the present disclosure, the method for recognizing a video is implemented by using a video recognition network, but the embodiments of this disclosure are not limited thereto.

At block 102, features of a first key frame in a video are extracted.

According to one or more embodiments of the present disclosure, the first key frame is any key frame in the video. For example, the first key frame is a key frame to be processed currently in a plurality of key frames of the video. Alternatively, the first key frame includes a plurality of frames, and no limitation is made thereto in the embodiments of this disclosure.

In an optional example, the operation in block 102 is performed by a processor by invoking a corresponding instruction stored in a memory, or is performed by a feature extraction network run by the processor.

At block 104, fusion is performed on the features of the first key frame and fusion features of a second key frame in the video to obtain fusion features of the first key frame.

The detection sequence of the second key frame in the video precedes that of the first key frame. In one or more optional embodiments, the second key frame is, for example, a previous key frame adjacent to the first key frame in the video. That is to say, the second key frame is a key frame located before the first key frame and adjacent to the first key frame in a plurality of frames in the video. Alternatively, the second key frame is other key frame located before the first key frame, and no limitation is made thereto in the embodiments of this disclosure.

The fusion features of the second key frame are obtained by performing fusion on the features of the second key frame and features of one or more other frames. The other frame herein is a frame different from the second key frame. According to one or more embodiments of the present disclosure, the other frame is a frame in the video with a detection sequence preceding that of the second key frame. In an optional example, the other frame includes one or more key frames located before the second key frame. In some examples of the embodiments of this disclosure, the fusion features of the second key frame are obtained by performing fusion processing on the features of the second key frame and fusion features of a third key frame in the video with a detection sequence preceding that of the second key frame. According to one or more embodiments of the present disclosure, the third key frame is a previous key frame of the second key frame, such that fusion is performed on the features of the second key frame and fusion features of the previous key frame (the third key frame) to obtain fusion features of the second key frame, and then fusion is performed on the fusion features of the second key frames and features of a following key frame (the first key frame) thereof to obtain fusion features of the first key frame, and so on. Each time features of a latest unfused key frame in the video are added for fusion, and by means of performing feature fusion, propagation, fusion, and propagation alternately, with respect to the manner of performing fusion on the features of the first key frame and features of all key frames located before the first key frame within a same period, computation overhead of feature fusion is reduced.

In one or more optional embodiments of this disclosure, the fusion features of the second key frame are obtained based on fusion of features of at least one key frame in a plurality of key frames of a video that is located before the second key frame, but the embodiments of this disclosure are not limited thereto.

In an optional example, the operation in 104 is performed by a processor by invoking a corresponding instruction stored in a memory, or is performed by a fusion network run by the processor.

At block 106, detection is performed on the first key frame according to the fusion features of the first key frame to obtain an object detection result of the first key frame.

The object detection result of the first key frame includes such as, for example, a category of the first key frame, or includes an object detection box in the first key frame and an object category corresponding to the object detection box.

In an optional example, the operation in block 106 is performed by a processor by invoking a corresponding instruction stored in a memory, or is performed by a detection network run by the processor.

Based on the method for recognizing a video provided in the embodiments of this disclosure, fusion is performed on features of a first key frame and fusion features of a second key frame in a video to obtain fusion features of the first key frame, and detection is performed on the first key frame according to the fusion features of the first key frame to obtain an object detection result of the first key frame, so that video recognition efficiency can be improved.

In the embodiments of this disclosure, when a video is recognized, a key frame to be processed currently is served as a current key frame or the first key frame, fusion is performed on features of the current key frame and fusion features of past key frames thereof (i.e., key frames located before the current key frame) in the video to obtain fusion features of the current key frame, and based on the obtained fusion features of the current key frame, recognition is performed on the current key frame. By means of iterative multi-frame feature fusion, information contained in shared features of these key frames in the video is enhanced, thereby improving frame recognition accuracy and video recognition performance.

In another example of the method for recognizing a video according to the embodiments of this disclosure, before performing the fusion on the features of the first key frame and fusion features of the second key frame in the video, an optical flow field between the first key frame and the second key frame is obtained, where the optical flow field includes a pixel-wise displacement vector from the first key frame to the second key frame. In addition, the fusion features of the second key frame are aligned with the first key frame according to the optical flow field between the first key frame and the second key frame, for example, the fusion features of the second key frame are warped according to the displacement vector in the optical flow field so that the fusion features of the second key frame are aligned with the first key frame. In this case, in the operation 104, fusion is performed on the aligned fusion features of the second key frame and the features of the first key frame to obtain fusion features of the first key frame.

In some examples of the method for recognizing a video according to the embodiments of this disclosure, the performing the fusion on the features of the first key frame and the fusion features of the second key frame includes: determining a weight coefficient of the features of the first key frame and a weight coefficient of the fusion features of the second key frame; and performing fusion on the features of the first key frame and the fusion features of the second key frame according to the weight coefficients of the features of the first key frame and the fusion features of the second key frame. The weight coefficients of the features of the first key frame and the fusion features of the second key frame are respectively used for representing proportions of the features of the first key frame and the fusion features of the second key frame during feature fusion. In at least one optional embodiment, according to the weight coefficients of the features of the first key frame and the fusion features of the second key frame, fusion is performed on a product of the features of the first key frame and the weight coefficient thereof and a product of the fusion features of the second key frame and the weight coefficient thereof. However, in the embodiments of this disclosure, feature fusion is also performed in other manners, and the embodiments of this disclosure do not limit implementation of the feature fusion.

For example, in the above optional implementation, the fusion features of the first key frame are obtained by means of the following formula:

$$f_{fuse} = (1-w) \cdot f_{old}^{key'} + w \cdot f_{new}^{key} \qquad (1)$$

In the formula (1), $f_{fuse}$ represents the fusion features of the first key frame, $f_{new}^{key}$ represents the features of the first key frame, w represents the weight coefficient of the features of the first key frame, $f_{old}^{key'}$ represents the fusion features of the second key frame, (1−w) represents the weight coefficient of the fusion features of the second key frame, and the value of w is greater than 0 and less than 1.

In still another example of the method for recognizing a video according to the embodiments of this disclosure, if a certain key frame is an initial key frame of a video, the operation of feature fusion is not performed, and object detection is directly performed according to features of the initial key frame. Accordingly, the method for recognizing a video further includes:

determining whether the first key frame is an initial key frame (hereafter referred to as a $1^{st}$ key frame) in the video; and in response to the first key frame being the $1^{st}$ key frame in the video, detection is performed on the $1^{st}$ key frame according to features of the 1st key frame to obtain an object detection result of the $1^{st}$ key frame.

In addition, the features of the $1^{st}$ key frame are propagated to a next key frame (hereafter referred to as the $2^{nd}$ key frame), and feature fusion is performed on the features of the $1^{st}$ key frame and features of the next key frame. That is to say, fusion features of the $2^{nd}$ key frame in the video are obtained by performing fusion processing on the features of the $1^{st}$ key frame and the features of the $2^{nd}$ key frame. In this case, the features of the $1^{st}$ key frame can also be regarded as fusion features of the $1^{st}$ key frame, but the embodiments of this disclosure are not limited thereto.

According to one or more embodiments of the present disclosure, in response to the first key frame not being the initial key frame in the video, the operation of performing fusion on the features of the first key frame and the fusion features of the second key frame in the embodiments is performed.

In addition, in one or more optional examples of the method for recognizing a video according to the embodiments of this disclosure, the first key frame is selected from the video.

In some examples of the method for recognizing a video of the embodiments of this disclosure, the first key frame is selected from the video. In the embodiments of this disclosure, a key frame is selected in many manners. In an optional example, an image frame randomly selected from the video is used as the first key frame. In another optional example, an image frame selected from the video at an interval of several frames is used as the first key frame. For example, one frame is selected from every nine frames in the video and used as a key frame. Thus, intervals between a plurality of first key frames of the video are fixed. In another optional example, the video is split into a plurality of short video sequences (or segments), and an image frame separately selected from each short video sequence (or segment) is used as a key frame of the short video sequence (or segment), where key frames of the plurality of short video sequences (or segments) includes the first key frame. For example, the video is split into a plurality of short video sequences or segments including several frames to tens of frames, where the plurality of short video sequences or segments has a same length, i.e., the plurality of short video sequences or segments include a same number of frames, such as, for example, 10 frames, or the plurality of short video sequences or segments has unequal lengths. Then a key frame is selected from each short video sequence or segment, and no limitation is made thereto in the embodiments of this disclosure. Thus, the plurality of short video sequences or segments and key frames corresponding thereto are firstly determined, and then object detection is performed on each key frame.

In still another example, a short video sequence is selected from the video, and an image frame selected from the selected short video sequence is used as the first key frame. Thus, each time when it is required to perform object detection, a short video sequence or segment and a first key frame thereof are selected. According to one or more embodiments of the present disclosure, a short video sequence having a preset length is selected, or a short video sequence having a length is randomly selected, and no limitation is made thereto in the embodiments of this disclosure.

In the embodiments of this disclosure, the first key frame is selected from the short video sequence or segment in many manners. In an optional example, an image frame randomly selected from the short video sequence is used as the first key frame. Alternatively, a middle frame in the short video sequence is selected as the first key frame, where the middle frame herein is an image frame other than the initial frame and the last frame of the short video sequence, for example, for a short video sequence including 10 frames (represented by 0th to 9th frames), the middle frame is an image frame in 1st to 8th frames. The middle frame satisfies a certain preset condition, for example, a frame number of the middle frame is a preset value or the like. In an optional example, the middle frame is an image frame located in the middle or close to the middle in the short video sequence. For example, for a short video sequence including 10 frames (represented by 0th to 9th frames), the middle frame is the 4th or 5th frame, or the 3th or 6th frame, or the like; for a short video sequence including 11 frames (represented by 0th to 10th frames), the middle frame is the 5th frame, or the 4th or 6th frame adjacent thereto. According to one or more embodiments of the present disclosure, in the embodiments of this disclosure, the first frame or the last frame in the short video sequence is also used as the first key frame in the short video sequence.

According to one or more embodiments of the present disclosure, the first key frame is also selected in other manners, and the embodiments of this disclosure do not limit the manner of selecting the first key frame.

To reuse a shared feature in the video, in the embodiments of this disclosure, during recognition, the video is split into short video sequences, features of only a frame (key frame) in each short video sequence are extracted, and then by using a feature propagation mode based on an optical flow field, the features of the key frame are propagated onto other frame (non-key frame) in the short video sequence. With respect to selection of the first frame or the last frame in the short video sequence as the key frame, the middle frame is selected as the key frame, so that an average feature propagation distance is shortened, thereby minimizing errors caused by propagation between features of frames in the short video sequence, reducing total propagation time in the short video sequence, and improving accuracy of a detection result.

In yet another example of the method for recognizing a video according to the embodiments of this disclosure, object detection is further performed on the non-key frame according to the features of the key frame. For ease of understanding, description is made by taking object detection on a first non-key frame as an example, where According to one or more embodiments of the present disclosure, the first non-key frame is any frame rather than a key frame in the video or a non-key frame satisfying a certain condition in the video.

In an optional example, an optical flow field between the first non-key frame and the first key frame is obtained, features of the first non-key frame are obtained according to the optical flow field between the first non-key frame and the first key frame, and the fusion features of the first key frame, and the first non-key frame is detected according to the features of the first non-key frame to obtain an object detection result of the first non-key frame.

Exemplarily, a distance between the first key frame and the first non-key frame is less than a preset threshold, and in this case, for a certain non-key frame, by using a key frame away therefrom by a distance less than or equal to a preset threshold, object detection is performed on the non-key frame. According to one or more embodiments of the present disclosure, if a number of key frames satisfying the distance condition is at least two (i.e., greater than one), a key frame is randomly selected from the at least two key frames satisfying the condition or under a preset condition. Alternatively, the first key frame is a key frame closest to the first non-key frame in a plurality of key frames of the video, and in this case, for a certain non-key frame in the video, object detection on the non-key frame is performed by using a key frame closest thereto. Alternatively, the first non-key frame and the first key frame belong to a same short video sequence or segment, and in this case, object detection is performed on all non-key frames in the short video sequence or segment by using fusion features of a same key frame (i.e., a key frame in the short video sequence or segment), but the embodiments of this disclosure are not limited thereto.

In an optional example, after the obtaining an optical flow field between a first non-key frame and the first key frame, the fusion features of the first key frame are aligned with the first non-key frame according to the optical flow field between the first non-key frame and the first key frame. In this case, the features of the first non-key frame are obtained according to the optical flow field between the first non-key frame and the first key frame, and the aligned fusion features of the first key frame. According to one or more embodiments of the present disclosure, the features of the first non-key frame are also obtained in other manners, and the embodiments of this disclosure are not limited thereto.

Based on the at least one embodiment, detection of a non-key frame of interest in a short video sequence may be implemented, without detecting all frames in the short video sequence, for example, for a short video sequence having 10 frames, detection is performed on the 5th frame therein as a key frame, or the 2nd or 8th frame is also selected for detection.

Based on the at least one embodiment, frame-by-frame detection on a short video sequence may also be implemented, thereby implementing frame-by-frame detection on a video.

Thus, for a short video sequence, features of only one frame (i.e., a key frame) are extracted, features of remaining features are obtained by means of optical flow propagation, the features of the key frame are reused, feature extraction of a non-key frame is avoided, thereby avoiding redundant computations, and increasing a frame recognition speed.

Figure 2:
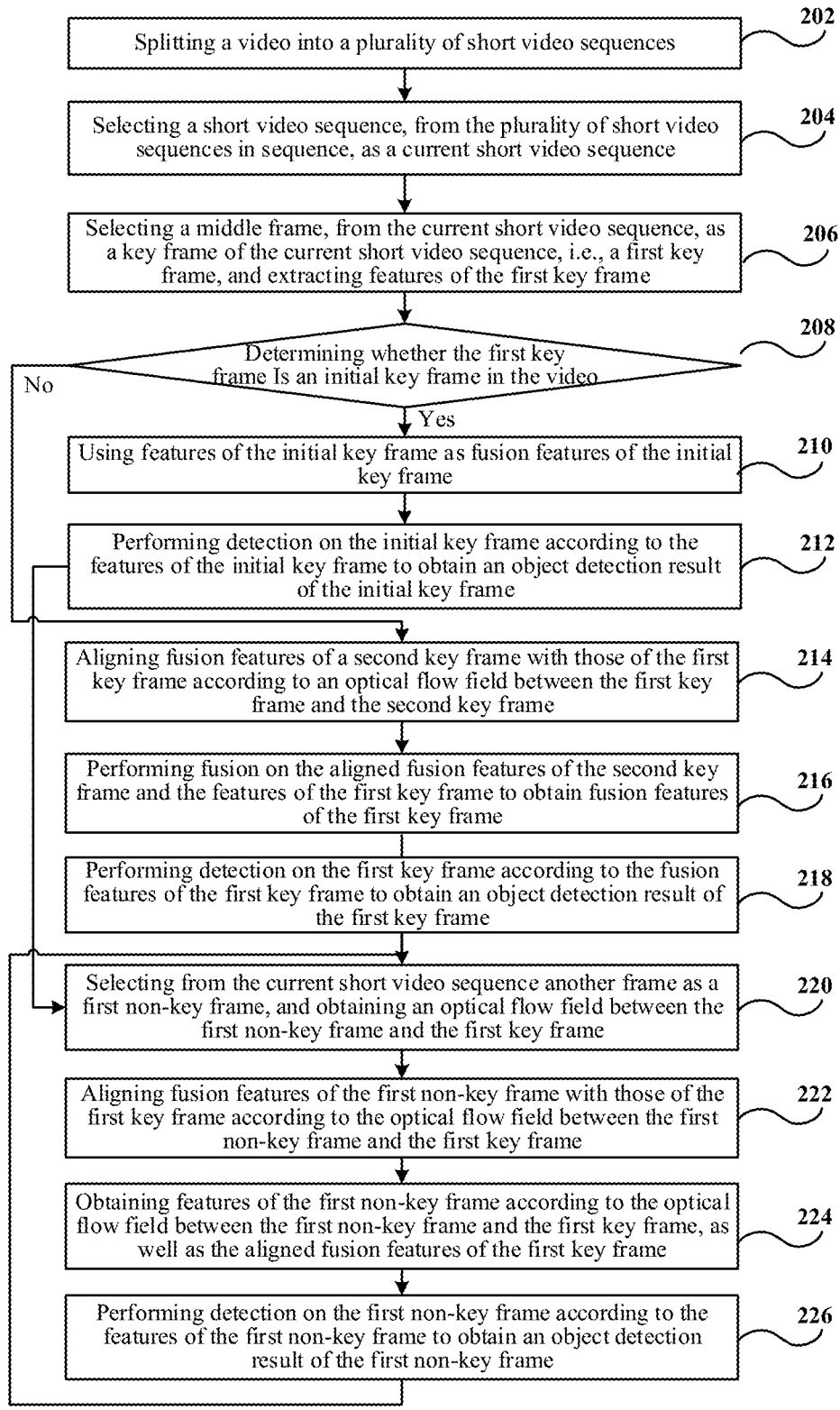
FIG. 2 is another flowchart of the method for recognizing a video according to embodiments of this disclosure.

FIG. 2 is another schematic flowchart of a method for recognizing a video according to embodiments of this disclosure.

At 202, a video is split into a plurality of short video sequences (or segments).

The plurality of short video sequences includes a same number of frames or different numbers of frames, or some of the short video sequences include a same number of frames while other short video sequences include different numbers of frames.

At block 204, a short video sequence is selected from the plurality of short video sequences, and is used as a current short video sequence.

At block 206, a middle frame is selected from the current short video sequence as a key frame of the current short video sequence, i.e., a first key frame, and features of the first key frame are extracted.

In an optional example, the operations in blocks 202-206 are performed by a processor by invoking a corresponding instruction stored in a memory, or is performed by a selection module run by the processor.

At block 208, whether the first key frame is an initial key frame (i.e., the $1^{st}$ key frame) of the video is determined.

According to one or more embodiments of the present disclosure, it is determined whether the current short video sequence is an initial video sequence of the plurality of short video sequences on which detection is performed.

If the first key frame is the $1^{st}$ key frame of the video, operations in blocks 210-212 are performed. Otherwise, if the first key frame is not the $1^{st}$ key frame in the video, operation in block 214 is performed.

In an optional example, the operation in block 208 is performed by a processor by invoking a corresponding instruction stored in a memory, or is performed by a determination module run by the processor.

At block 210, features of the $1^{st}$ key frame are used as fusion features of the $1^{st}$ key frame.

According to one or more embodiments of the present disclosure, the features of the $1^{st}$ key frame are cached as the fusion features of the $1^{st}$ key frame.

In an optional example, the operation in block 210 is performed by a processor by invoking a corresponding instruction stored in a memory, or is performed by a light processing module run by the processor.

At block 212, detection is performed on the $1^{st}$ key frame according to the features of the $1^{st}$ key frame to obtain an object detection result of the $1^{st}$ key frame.

In an optional example, the operation in block 212 is performed by a processor by invoking a corresponding instruction stored in a memory, or is performed by a detection network run by the processor.

Then, operation in block 220 is performed.

At block 214, fusion features of a second key frame are aligned with the first key frame according to an optical flow field between the first key frame and the second key frame.

The detection sequence of the second key frame in the video precedes that of the first key frame. According to one or more embodiments of the present disclosure, the second key frame is a previous key frame on which detection is performed.

The fusion features of the second key frame are obtained by performing fusion processing on the features of the second key frame and fusion features of a third key frame in the video with a detection sequence preceding that of the second key frame.

In an optional example, the operation in block 214 is performed by a processor by invoking a corresponding instruction stored in a memory, or is performed by an optical flow propagation module run by the processor.

At block 216, fusion is performed on the aligned fusion features of the second key frame and the features of the first key frame to obtain fusion features of the first key frame.

In an optional example, the operation in block 216 is performed by a processor by invoking a corresponding instruction stored in a memory, or is performed by a fusion network run by the processor.

At block 218, detection is performed on the first key frame according to the fusion features of the first key frame to obtain an object detection result of the first key frame.

In the embodiments of this disclosure, an object detection result of an image frame is a category of the image object, or at least one object detection box in the image frame and an object category corresponding to the object detection box. The object detection result of the first key frame includes such as, for example, a category of the first key frame, or includes an object detection box in the first key frame and an object category corresponding to the object detection box, and no limitation is made thereto in the embodiments of this disclosure.

In an optional example, the operation in block 218 is performed by a processor by invoking a corresponding instruction stored in a memory, or is performed by a detection network run by the processor.

At block 220, another frame is selected from the current short video sequence as a first non-key frame, and an optical flow field between the first non-key frame and the first key frame is obtained.

In some examples, the selecting another frame from the current short video sequence as a first non-key frame, starting from the first key frame, another frame is selected along a reverse direction of time sequence successively as the first non-key frame, or another frame is selected successively along a forward direction and a reverse direction of the time sequence alternatively as the first non-key frame, or another frame is selected successively along a reverse direction and a forward direction of the time sequence alternatively as the first non-key frame, till all frames in the current short video sequence are selected. In addition, as another optional implementation, there is no need to recognize each image frame in the current short video sequence, and in this case, by referring to a similar manner, one or more other frames are selected from the current short video sequence as the first non-key frame, but the embodiments of this disclosure are not limited thereto.

At block 222, fusion features of the first non-key frame are aligned with the first key frame according to the optical flow field between the first non-key frame and the first key frame.

At block 224, features of the first non-key frame are obtained according to the optical flow field between the first non-key frame and the first key frame, as well as the aligned fusion features of the first key frame.

In an optional example, the operations in blocks 220-224 are performed by a processor by invoking a corresponding instruction stored in a memory, or is performed by an optical flow propagation module run by the processor.

At block 226, the first non-key frame is detected according to the features of the first non-key frame to obtain an object detection result of the first non-key frame.

The object detection result of the first non-key frame includes, for example, a category of the first non-key frame, or an object detection box in the first non-key frame and an object category corresponding to the object detection box.

In an optional example, the operation in block 226 is performed by a processor by invoking a corresponding instruction stored in a memory, or is performed by a detection network run by the processor.

In one or more optional examples, the operations in blocks 220-226 are performed on non-key frames needing to be recognized in the current short video sequence till all the non-key frames needing to be recognized in the current short video sequence are recognized, and then the process is performed on a next short video sequence till all the short video sequences are recognized.

In the method for recognizing a video provided in the embodiments of this disclosure, features of each key frame are used for not only recognition of this frame, but also making a contribution to a shared fusion feature throughout the whole video. The shared fusion feature absorbs information of a plurality of key frames, and at each key frame, fusion is performed on the shared fusion feature and deep features of the current key frame to enhance the features of the key frame, so as to avoid a recognition failure during blurring of a corresponding image. The shared fusion feature is propagated to the key frames one by one, and is updated at each key frame. The enhanced features of the key frames are also propagated for recognition of other non-key frames.

Typical video feature reuse is implemented by computing an optical flow field between two frames first by using an algorithm with a high speed, and then features of a reference frame are quickly propagated onto a target frame by means of bilinear difference feature deformation. However, additional noise is introduced by errors of the optical flow algorithm, thereby reducing accuracy. Video feature enhancement based on an attention mechanism can handle problems such as motion blur and out of focus to a certain extent. However, in this method, it is required to align features by using an optical flow field, and a large amount of optical flow computations causes a sharp decrease in speed. In the method for recognizing a video provided in the embodiments of this disclosure, redundancy and complementarity of video information are fully utilized, redundant computation is avoided by means of sparse feature extraction, and features are reused by means of optical flow propagation. On this basis, by means of optimized selection of a key frame position, noise introduced by optical flow computation is reduced, and by means of an iterative feature fusion algorithm, information contained in a shared feature is enhanced, thereby improving speed and accuracy compared with other video feature reuse methods.

In the embodiments of this disclosure, by means of iterative multi-frame feature fusion, information contained in a shared feature of these key frames is enhanced, frame recognition accuracy is improved, and video recognition performance is improved. Moreover, at each time, instead of fusing features of all second key frames and features of the first key frame, features of a latest unfused frame are added for fusion, thereby reducing computation overhead of feature fusion, and improving video recognition efficiency. Secondly, compared with regularly selecting the initial frame as a key frame, the key frame position selection manner of selecting a middle frame as a key frame reduces an average feature propagation distance, thereby minimizing errors introduced by feature propagation between image frames in a short video sequence, shortening a total feature propagation time of the short video sequence, and improving accuracy of a detection result. In addition, redundancy and complementarity of information of image frames in a video are fully utilized, features of only a key frame, rather than of each image frame, are extracted, features of the image frames are reused by means of optical flow propagation, and redundant computation is avoided by means of sparse feature extraction. With respect to the manner of extracting features frame by frame, video recognition speed and efficiency are improved.

In addition, by means of performing "fusion, propagation, fusion, and propagation" alternately, each time when fusion is performed, it is required to propagate features of merely a latest unfused frame. With respect to other manners in which each time when a fusion operation is performed, it is required to propagate features of each frame to be fused via the optical flow, computation overhead of propagation is reduced.

The method for recognizing a video provided in the embodiments of this disclosure can be applied to various scenarios. For example, during aerial photography of wild animals by an intelligent drone, it is required to recognize the animals in a picture as quickly as possible to implement real-time analysis. However, due to effects of airflow and the like, shake and blur are possibly present in the picture. In addition, the wild animals per se are possibly running quickly. These factors lead to a picture having low quality. A conventional video recognition network is unable to satisfy requirements for accuracy and speed in practical applications, while the technical solution provided in the embodiments of this disclosure can improve video recognition accuracy and speed.

Figure 3:
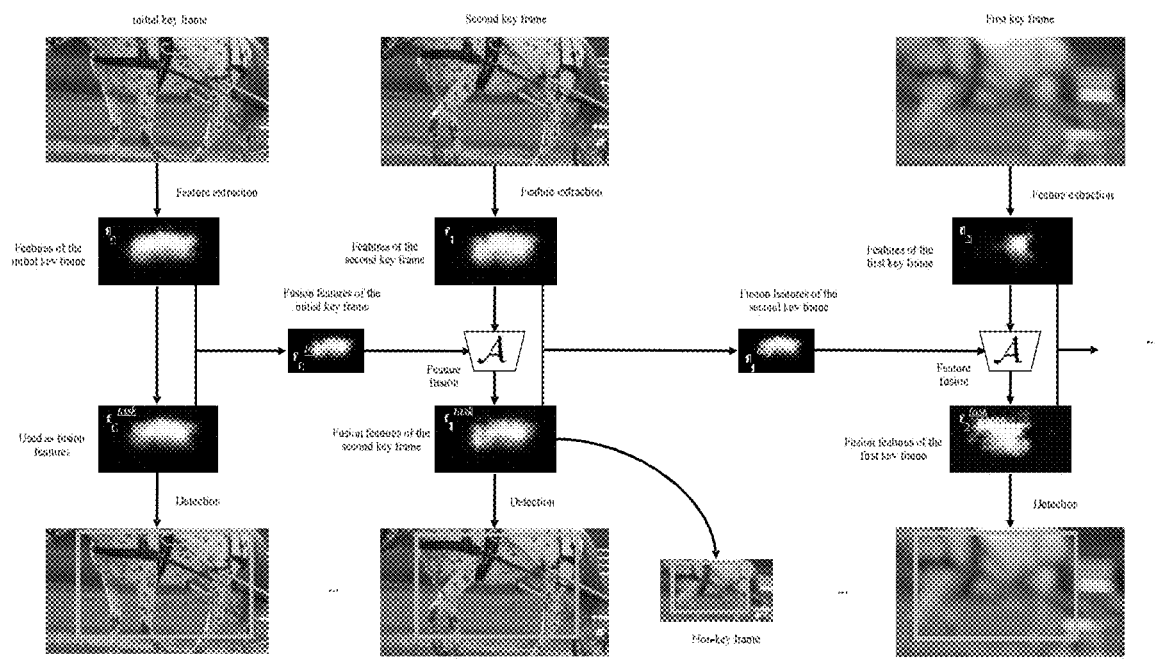
FIG. 3 is a corresponding process schematic diagram of an example of the method for recognizing a video shown in FIG. 2.

FIG. 3 is a corresponding process schematic diagram of an example of a method for recognizing a video shown in FIG. 2. It should be understood that the examples in FIG. 2 and FIG. 3 are only used for helping understand the technical solution of this disclosure, and shall not be understood as limitations to this disclosure.

The method for recognizing a video according to the embodiments of this disclosure may be implemented via a trained video recognition network, and the video recognition network may be implemented via a neural network, where the neural network is a deep neural network for example. Before the method for recognizing a video according to the embodiments is implemented via the video recognition network, the video recognition network is trained.

In one or more optional embodiments, the method for recognizing a video also implements training of a video recognition network. According to one or more embodiments of the present disclosure, an image frame (including a key frame and/or non-key frame) in the video is used as a sample image frame, where the sample image frame has tag information. In this case, the method for recognizing a video further includes: training a video recognition network based on a difference between an object detection result of at least one image frame in the video and the tag information, where the at least one image frame includes the first key frame. For example, the video recognition network is trained by means of stochastic gradient descent, till a preset training completion condition is satisfied. The preset training completion condition includes, for example: the difference between the object detection result of the at least one image frame and the tag information satisfies a certain condition, and/or the video recognition network is trained for a preset number of times.

In an optional implementation, the tag information includes: position information (for example, position information of an object box) and/or category information of at least one object contained in the image frame. Accordingly, the object detection result includes an object detection box and/or an object category corresponding to the object detection box. In one or more optional examples, during training of the video recognition network, network parameter values in the video recognition network are adjusted based on the difference between the object detection box in the object detection result of the at least one image frame in the video and the corresponding position information in the tag information and/or a difference between the object category corresponding to the object detection box and the category information in the tag information.

The method for training a video recognition network provided in the embodiments of this disclosure is described in detail below with reference to FIG. 4.

Figure 4:
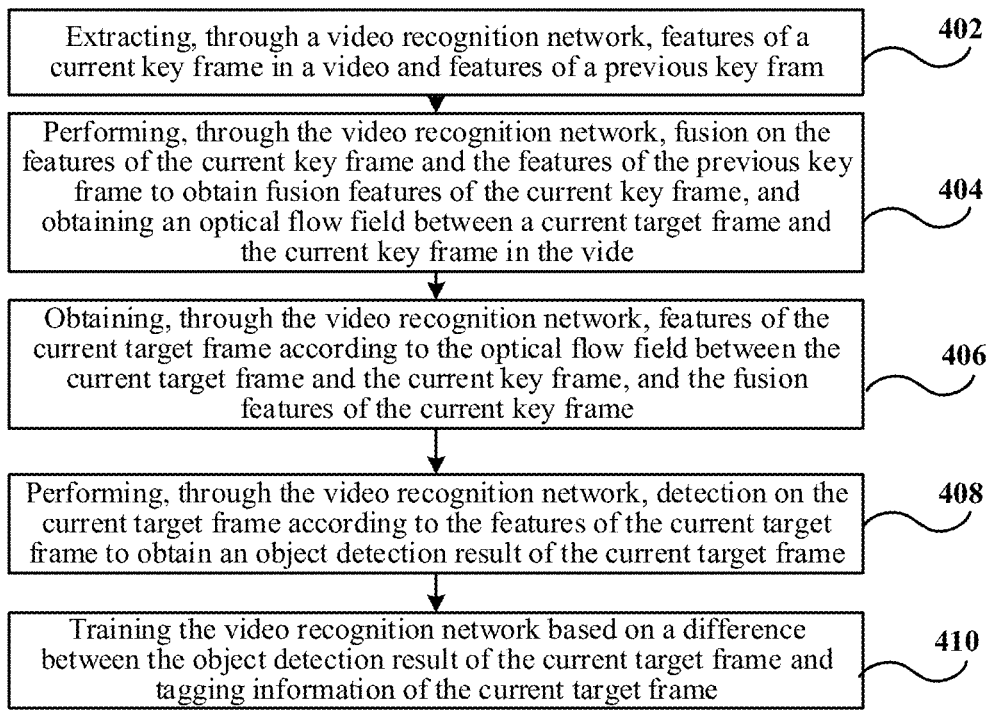
FIG. 4 is a flowchart of a method for training a video recognition network according to embodiments of this disclosure.

FIG. 4 is a flowchart of a method for training a video recognition network according to embodiments of this disclosure.

At block 402, features of a current key frame in a video sample and features of a previous key frame in the video sample are extracted by using the video recognition network.

At block 404, fusion is performed, by using the video recognition network, on the features of the current key frame and the features of the previous key frame to obtain fusion features of the current key frame, and an optical flow field between a current target frame in the video sample and the current key frame in the video sample is obtained, where the current target frame and the current key frame belong to a same segment (hereafter referred to as a current segment) of the video sample, and the current target frame is a frame other than a key frame in the current segment.

At block 406, features of the current target frame are obtained by using the video recognition network according to the optical flow field between the current target frame and the current key frame, as well as the fusion features of the current key frame.

At block 408, the current target frame is detected by using the video recognition network according to the features of the current target frame to obtain an object detection result of the current target frame.

In an optional example, the operations in blocks 402-408 are performed by a processor by invoking a corresponding instruction stored in a memory, or is performed by a video recognition network or corresponding modules in an apparatus for recognizing a video run by the processor.

At block 410, the video recognition network is trained, i.e., network parameter values of the video recognition network are adjusted, based on a difference between the object detection result of the current target frame and tag information of the current target frame.

In an optional example, the operation in block 410 is performed by a processor by invoking a corresponding instruction stored in a memory, or is performed by a training module run by the processor.

Based on the method for training a video recognition network provided in the embodiments of this disclosure, fusion is performed on the features of the current key frame in the video sample and the features of the previous key frame to obtain fusion features of the current key frame, then the fusion features of the current key frame are propagated to the current target frame for detection to obtain an object detection result of the current target frame, and the video recognition network is trained based on a difference between the object detection result of the current target frame and tag information. For the video recognition network obtained based on training of the method for training a video recognition network according to the embodiments of this disclosure, when a video is recognized, fusion is performed on features of each key frame and features of a previous key frame in the video, and the fusion features are then propagated to a current target frame for detection. By means of iterative multi-frame feature fusion, information contained in a shared feature of these key frames is enhanced, frame recognition accuracy is improved, and video recognition performance is improved. Moreover, each time features of a latest unfused frame are added for fusion, but not fusion is performed on all features of a second key frame and features of a first key frame, thereby reducing computation overhead of feature fusion, and improving video recognition efficiency.

In one optional example, the training method is an iteratively performed process. That is to say, each frame in the video is used as the current target frame to perform the process till a preset training completion condition is satisfied, so as to complete the training of the video recognition network.

In some examples of the training method according to the embodiments of this disclosure, the performing fusion on features of the current key frame and features of the previous key frame to obtain fusion features of the current key frame includes:

obtaining an optical flow field between the current key frame and the previous key frame;

aligning the features of the previous key frame with the current key frame according to the optical flow field between the current key frame and the previous key frame; and performing fusion on the aligned features of the previous key frame and the features of the current key frame.

In some examples of the training method according to the embodiments of this disclosure, the performing the fusion on the features of the previous key frame and the features of the current key frame includes:

determining a weight coefficient of the features of the previous key frame and a weight coefficient of the features of the current key frame; and performing fusion on the features of the previous key frame and the features of the current key frame according to the weight coefficient of the features of the previous key frame and the weight coefficient of the features of the current key frame.

Before the training method embodiments of this disclosure, the method further includes: selecting the current key frame, the previous key frame, and the current target frame from the video sample.

In one optional implementation, the selecting the current key frame, the previous key frame, and the current target frame from the video sample includes:

using an image frame selected from the video sample as the current target frame; and Using an image frame in the video sample sampled forward a first distance by using the current target frame as a starting point, as the previous key frame, and using an image frame in the video sample sampled backward a second distance by using the current target frame as the starting point, as the current key frame.

In one optional example, the second distance is less than the first distance. Thus, a distance between the current target frame and the current key frame is less than a distance between the current target frame and the previous key frame.

For example, in an application example, an image frame is randomly selected from the video sample as the current target frame, and tag information is provided for the current target frame. In addition, an image frame, in the video sample, is sampled forward a random distance starting from the current target frame as a key frame (i.e., the previous key frame) of a previous short video sequence, for example, it is assumed that the short video sequence has a length of 10 frames, the previous key frame is located between the 5th frame and the 15th frame prior to the current target frame. Moreover, an image frame, in the video sample, is sampled backward a smaller random distance (i.e., the second distance) starting from the current target frame as a key frame (i.e., the current key frame) of the current segment, for example, it is assumed that the short video sequence has a length of 10 frames, the current key frame is located between the −5th frame and the 5th frame subsequent to the current key frame. According to one or more embodiments of the present disclosure, in the embodiments of this disclosure, a previous key frame and a current key frame of a certain image frame are also obtained in other manners, and no limitation is made thereto in the embodiments of this disclosure.

In addition, in the training method according to the embodiments of this disclosure, According to one or more embodiments of the present disclosure, the tag information of the current target frame in the video includes: position information (for example, position information of an object box) and/or category information of at least one object contained in the current target frame; the object detection result of the current target frame includes at least one object detection box in the current target frame and an object category corresponding to the object detection box. Accordingly, in the embodiments, the training the video recognition network based on the difference between the object detection result of the current target frame and the tag information of the current target frame includes: adjusting network parameter values in the video recognition network based on the difference between the object detection box in the object detection result of the current target frame and the position information in the tag information and/or based on a difference between the object category corresponding to the object detection box and the category information in the tag information.

Figure 5:
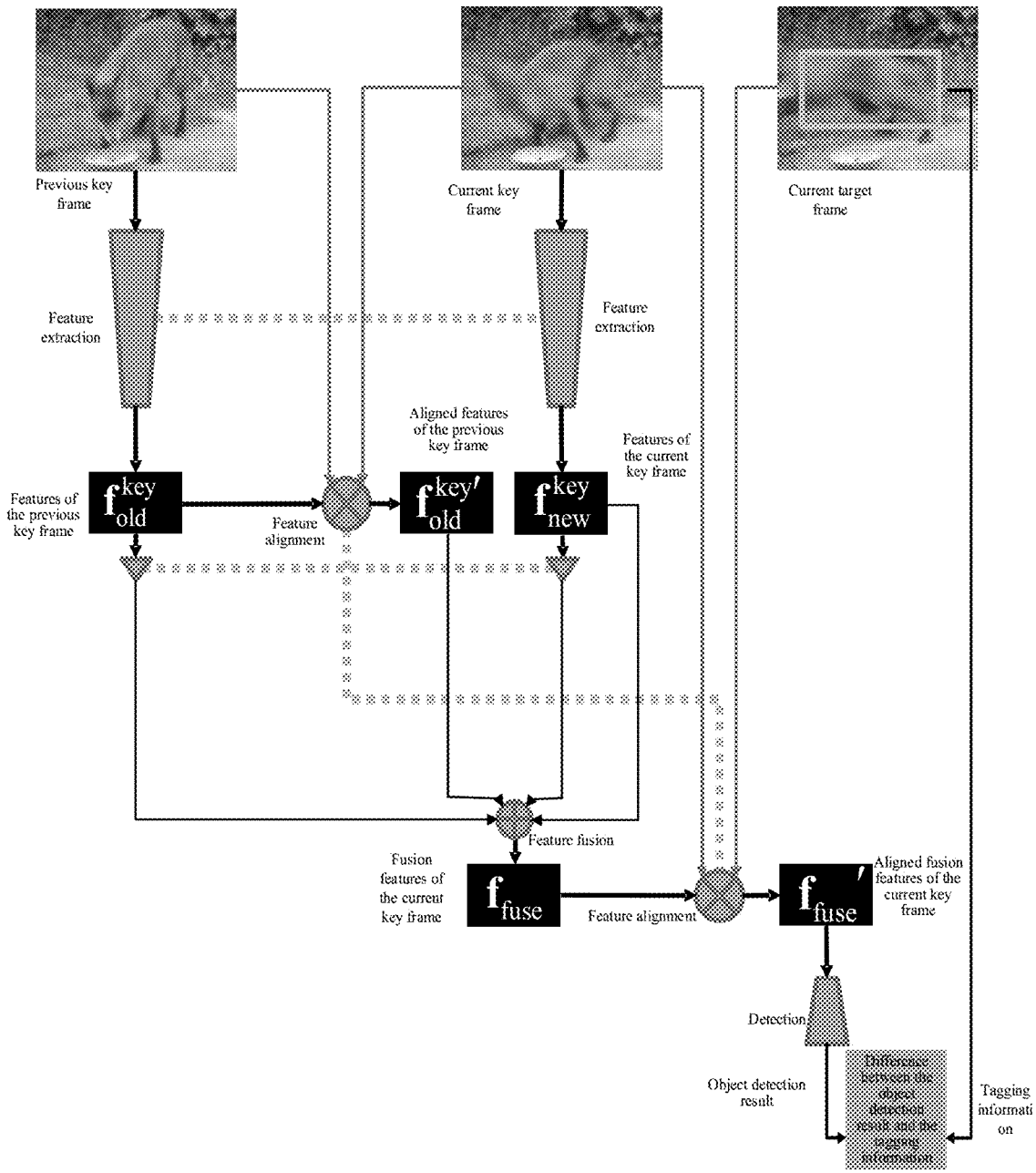
FIG. 5 is a corresponding process schematic diagram of an example of the training method shown in FIG. 4.

In the training method embodiments of this disclosure, a training sample is constituted by each group of the current key frame, the previous key frame, and the current target frame that are selected, a training sample set is constituted by at least one training sample, and training samples are selected from the training sample set in sequence to perform the training method process and perform iterative training on the video recognition network till a preset training completion condition is satisfied, for example, a difference between the object detection result of the current target frame and the category information in the tag information of the current target frame is less than a preset difference, and/or the video recognition network is trained a preset number of times. FIG. 5 is a corresponding process schematic diagram of an embodiment shown in FIG. 4. It should be understood that the example in FIGS. 4 and 5 is only used for helping understand the technical solution of this disclosure, but shall not be understood as limitations to this disclosure.

In the training method provided in the embodiments of this disclosure, three images randomly sampled in the video are used to simulate a working state during application. First, a frame is randomly selected as a current to-be-recognized target frame, then a frame, randomly sampled forward a random distance, as a key frame of a previous segment, and then a frame, randomly sampled backward a smaller random distance, as a key frame of a current segment. Features of the key frames of the previous segment are propagated to the key frame of the current segment by means of an optical flow, and a position-wise fusion weight is generated via a sub-network, and fused features of the key frames are obtained by averaging according to the weight. The fused features of the key frames are propagated to the current to-be-recognized target frame by means of the optical flow, and sent to a specific recognition task network, errors with tags are generated, and back propagation of the errors is performed to optimize the whole frame.

In addition, the embodiments of this disclosure further provide another method for recognizing a video, including: obtaining a to-be-recognized video; and recognizing, by a video recognition network, the video to obtain a video recognition result, where the video recognition network is obtained by training in the training method according to any one of the embodiments of this disclosure.

Any method for recognizing a video or method for training a video recognition network provided in the embodiments of this disclosure is performed by any appropriate device having data processing capability, including, but not limited to, a terminal device, a server and the like. Alternatively, any method for recognizing a video or method for training a video recognition network provided in the embodiments of this disclosure is performed by a processor, for example, the processor performs any method for recognizing a video or method for training a video recognition network provided in the embodiments of the present application by invoking a corresponding instruction stored in a memory. Details are not described below again.

A person of ordinary skill in the art may understand that all or some operations for implementing the embodiments of the foregoing method is achieved by a program by instructing related hardware; the foregoing program can be stored in a computer-readable storage medium; when the program is executed, operations including the embodiments of the foregoing method are performed. Moreover, the foregoing storage medium includes various media capable of storing program codes such as ROM, RAM, a magnetic disk, or an optical disk.

Figure 6:
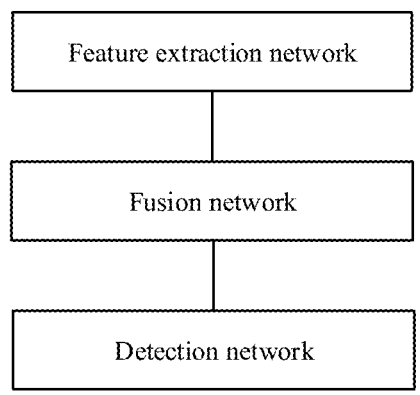
FIG. 6 is a schematic structural diagram of an apparatus for recognizing a video according to embodiments of this disclosure.

FIG. 6 is a schematic structural diagram of an apparatus for recognizing a video according to embodiments of this disclosure. The apparatus for recognizing a video is configured to implement the method for recognizing a video provided in the embodiments of this disclosure. As shown in FIG. 6, the apparatus for recognizing a video includes: a feature extraction network, a fusion network, and a detection network.

The feature extraction network is configured to extract features of a first key frame in a video. The first key frame is any key frame in a video, for example, the first key frame is regarded as a key frame to be processed currently in a plurality of key frames of the video.

The fusion network is configured to perform fusion on the features of the first key frame and fusion features of a second key frame in the video to obtain fusion features of the first key frame, where a detection sequence of the second key frame in the video precedes that of the first key frame, and the second key frame is, for example, a previous key frame adjacent to the first key frame in the video. In an implementation of the embodiments of this disclosure, the fusion features of the second key frame are obtained by performing fusion processing on the features of the second key frame and fusion features of a third key frame in the video with a detection sequence preceding that of the second key frame.

The detection network is configured to perform detection on the first key frame according to the fusion features of the first key frame to obtain an object detection result of the first key frame. The object detection result of the first key frame includes such as, for example, a category of the first key frame, or includes an object detection box in the first key frame and an object category corresponding to the object detection box.

Based on the apparatus for recognizing a video provided in the embodiments of this disclosure, fusion is performed on features of a first key frame and fusion features of a second key frame in a video to obtain fusion features of the first key frame, and detection is performed on the first key frame according to the fusion features of the first key frame to obtain an object detection result of the first key frame. In the embodiments of this disclosure, when a video is recognized, fusion is performed on features of each key frame and fusion features of a second key frame in the video to obtain fusion features of the first key frame, and based on the obtained fusion features of the first key frame, the first key frame is recognized. By means of iterative multi-frame feature fusion, information contained in a shared feature of these key frames in the video is enhanced, thereby improving frame recognition accuracy and video recognition performance. Moreover, each time features of a latest unfused frame are added for fusion, but not fusion is performed on all features of the second key frame and features of the first key frame, thereby reducing computation overhead of feature fusion, and improving video recognition efficiency.

Figure 7:
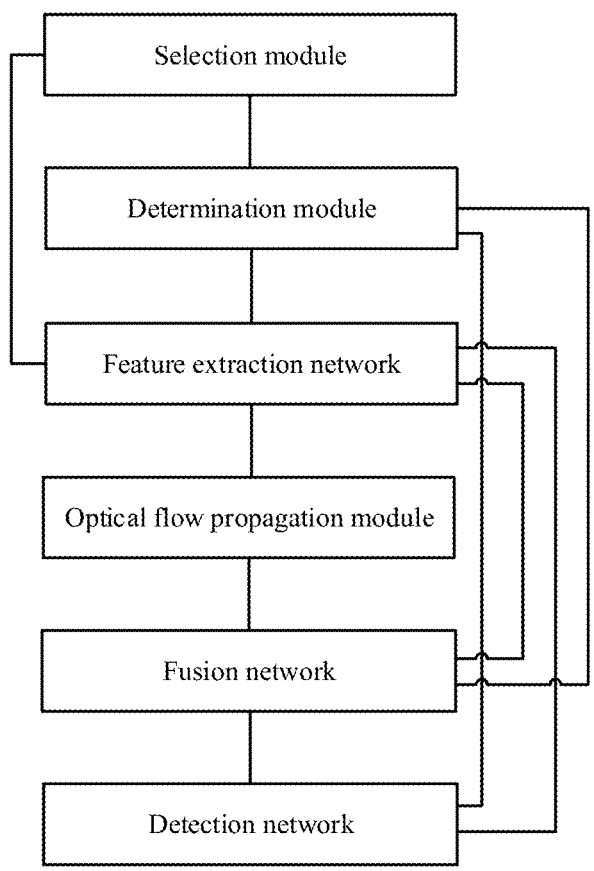
FIG. 7 is another schematic structural diagram of the apparatus for recognizing a video according to embodiments of this disclosure.

FIG. 7 is another schematic structural diagram of an apparatus for recognizing a video according to embodiments of this disclosure. As shown in FIG. 7, compared with the apparatus for recognizing a video shown in FIG. 6, the apparatus for recognizing a video further includes: an optical flow propagation module, configured to obtain an optical flow field between the first key frame and the second key frame, and to align the fusion features of the second key frame with the first key frame according to the optical flow field between the first key frame and the second key frame. Accordingly, the fusion network is configured to perform fusion on the aligned fusion features of the second key frame and the features of the first key frame to obtain fusion features of the first key frame.

In some examples of this disclosure, the performing fusion on the features of the first key frame and fusion features of a second key frame in the video by the fusion network includes: determining a weight coefficient of the features of the first key frame and a weight coefficient of the fusion features of the second key frame; and performing fusion on the features of the first key frame and the fusion features of the second key frame according to the weight coefficient of the features of the first key frame and the weight coefficient of the fusion features of the second key frame.

In addition, with reference to FIG. 7 again, in still another example of the apparatus for recognizing a video according to the embodiments of this disclosure, the apparatus for recognizing a video further includes: a determination module, configured to determine whether the first key frame is the initial key frame in the video. Accordingly, the fusion network is configured to perform, according to a determining result of the determination module, fusion on the features of the first key frame and the fusion features of the second key frame in the video in response to the first key frame being not the initial key frame in the video.

In addition, According to one or more embodiments of the present disclosure, in another possible implementation, the detection network is further configured to detect, according to the determining result of the determination module, the first key frame according to the features of the first key frame in response to the first key frame being the initial key frame in the video to obtain an object detection result of the first key frame.

In addition, with reference to FIG. 7 again, in yet another example of the apparatus for recognizing a video according to the embodiments of this disclosure, the apparatus for recognizing a video further includes a selection module, configured to select the first key frame from the video.

In one implementation, the selection module is configured to: use an image frame randomly selected from the video as the first key frame; or use an image frame selected from the video at an interval of several frames as the first key frame; or split the video into a plurality of short video sequences, and separately select an image frame from each short video sequence as a key frame of each short video sequence, the key frames of the plurality of short video sequences including the first key frame; or select a short video sequence from the video, and use an image frame selected from the selected short video sequence as the first key frame.

In one optional example, using, by the selection module, an image frame randomly selected from the video as the first key frame is used for: using an image frame randomly selected from the short video sequence as the first key frame; or selecting a middle frame in the short video sequence as the first key frame, where the middle frame includes image frames of the short video sequence where the middle frame is located other than a first frame and a last frame. The middle frame includes: an image frame located in the middle or close to the middle in the short video sequence where the middle frame is located.

In addition, in the apparatus for recognizing a video of the embodiments, the optical flow propagation module is further configured to obtain an optical flow field between the first non-key frame and the first key frame, and obtain features of the first non-key frame according to the optical flow field between the first non-key frame and the first key frame, and the fusion features of the first key frame. Accordingly, the detection network is further configured to perform detection on the first non-key frame according to the features of the first non-key frame to obtain an object detection result of the first non-key frame.

A distance between the first key frame and the first non-key frame is less than a preset threshold; or the first key frame is a key frame closest to the first non-key frame in key frames in the video; or the first non-key frame and the first key frame belong to a same short video sequence.

In one implementation, the optical flow propagation module is configured to align the fusion features of the first key frame with the first non-key frame according to the optical flow field between the first non-key frame and the first key frame, and obtain the features of the first non-key frame according to the optical flow field between the first non-key frame and the first key frame, and the aligned fusion features of the first key frame.

According to one or more embodiments of the present disclosure, the apparatus for recognizing a video provided in the embodiments of this disclosure is implemented via a video recognition network; the image frame in the video is provided with tag information. Accordingly, in some possible implementations of the apparatus for recognizing a video, the apparatus for recognizing a video further includes: a training module configured to train a video recognition network based on a difference between an object detection result of at least one image frame in the video and the tag information, where the at least one image frame includes the first key frame.

In one implementation, the tag information includes: position information (for example, position information of an object box) and/or category information of at least one object; the object detection result includes an object detection box and an object category corresponding to the object detection box. Accordingly, the training module is configured to adjust network parameter values in the video recognition network based on the difference between the object detection box in the object detection result of the at least one image frame in the video and the position information in the tag information and/or based on a difference between the object category corresponding to the object detection box and the category information in the tag information.

Figure 8:
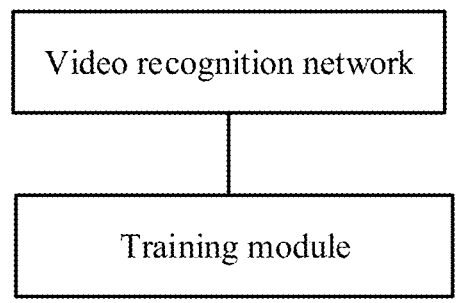
FIG. 8 is a schematic diagram of an apparatus for training a video recognition network according to embodiments of this disclosure.

FIG. 8 is a schematic structural diagram of an apparatus for training a video recognition network according to embodiments of this disclosure. The training apparatus is configured to implement the method for training a video recognition network shown in FIG. 4 of this disclosure. As shown in FIG. 8, the training apparatus includes: a video recognition network and a training module.

The video recognition network is configured to: extract features of a current key frame in a video sample and features of a previous key frame in the video sample; perform fusion on the features of the current key frame and the features of the previous key frame to obtain fusion features of the current key frame, and obtain an optical flow field between a current target frame in the video sample and the current key frame in the video sample, where the current target frame and the current key frame belong to a same segment of the video sample, for example, the current target frame is a frame other than the current key frame in a segment where the current key frame is located; to obtain features of the current target frame according to the optical flow field between the current target frame and the current key frame, and the fusion features of the current key frame; and perform detection on the current target frame according to the features of the current target frame to obtain an object detection result of the current target frame.

The training module is configured to train the video recognition network, i.e., to adjust network parameter values of the video recognition network, based on a difference between the object detection result of the current target frame and tag information of the current target frame.

Based on the apparatus for training a video recognition network according to the embodiments of this disclosure, fusion is performed on the features of the current key frame in the video sample and the features of the previous key frame to obtain fusion features of the current key frame, then the fusion features of the current key frame are propagated to the current target frame for detection to obtain an object detection result of the current target frame, and the video recognition network is trained based on a difference between the object detection result of the current target frame and tag information. For the video recognition network obtained based on training of the apparatus for training a video recognition network according to the embodiments of this disclosure, when a video is recognized, fusion is performed on features of each key frame and features of a previous key frame in the video, and the fusion features are then propagated to a current target frame for detection. By means of iterative multi-frame feature fusion, information contained in a shared feature of these key frames is enhanced, frame recognition accuracy is improved, and video recognition performance is improved. Moreover, each time features of a latest unfused frame are added for fusion, but not fusion is performed on all features of a second key frame and features of a first key frame, thereby reducing computation overhead of feature fusion, and improving video recognition efficiency.

Figure 9:
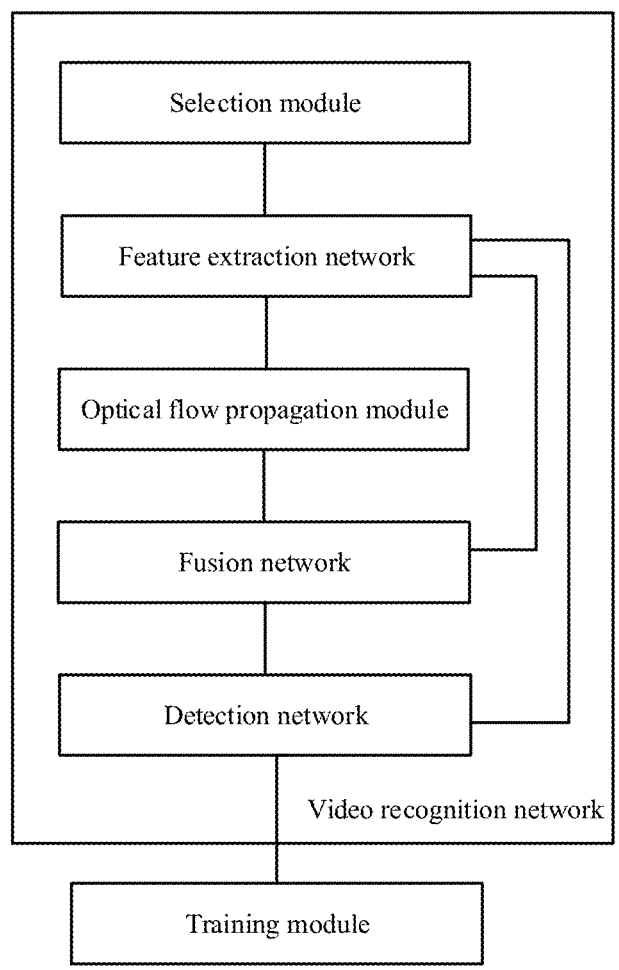
FIG. 9 is another schematic diagram of the apparatus for training a video recognition network according to embodiments of this disclosure.

FIG. 9 is another schematic structural diagram of an apparatus for training a video recognition network according to embodiments of this disclosure. As shown in FIG. 9, the video recognition network includes: a feature extraction network, an optical flow propagation module, a fusion network, and detection network.

The feature extraction network is configured to extract features of a current key frame in a video and features of a previous key frame in the video.

The optical flow propagation module is configured to obtain an optical flow field between the current key frame and the previous key frame, align the features of the previous key frame with the current key frame according to the optical flow field between the current key frame and the previous key frame, obtain an optical flow field between a current target frame and the current key frame, and obtain features of the current target frame according to the optical flow field between the current target frame and the current key frame, and the fusion features of the current key frame.

The fusion network is configured to perform fusion on the aligned features of the previous key frame and the features of the current key frame to obtain fusion features of the current key frame.

The detection network is configured to perform detection on the current target frame according to the features of the current target frame to obtain an object detection result of the current target frame.

In one implementation, when performing fusion on features of the previous key frame and features of the current key frame, the fusion network is configured to: determining a weight coefficient of the features of the previous key frame and a weight coefficient of the features of the current key frame; and performing fusion on the features of the previous key frame and the features of the current key frame according to the weight coefficient of the features of the previous key frame and the weight coefficient of the features of the current key frame.

In addition, with reference to FIG. 9 again, in still another example of the apparatus for recognizing a video, the apparatus for recognizing a video further includes: a selection module, configured to select the current key frame, the previous key frame, and the current target frame from the video sample.

In one implementation, the selection module is configured to: use an image frame selected from the video sample as the current target frame; and use an image frame in the video sample sampled forward a first distance by using the current target frame as a starting point, as the previous key frame, and use an image frame in the video sample sampled backward a second distance by using the current target frame as the starting point, as the current key frame.

Exemplarily, the second distance is less than the first distance.

In the training apparatus, According to one or more embodiments of the present disclosure, the tag information of the current target frame includes: position information (for example, position information of an object box) and category information of at least one object contained in the current target frame; the object detection result of the current target frame includes an object detection box in the current target frame and an object category corresponding to the object detection box. Accordingly, the training module is configured to adjust network parameter values in the video recognition network based on the difference between the object detection box in the object detection result of the current target frame and the position information in the tag information and/or based on a difference between the object category corresponding to the object detection box and the category information in the tag information.

In the possible implementations of the training apparatus, a training sample is constituted by each group of the current key frame, the previous key frame, and the current target frame, and a training sample set is constituted by at least one training sample. The training module is configured to select training samples from the training sample set in sequence to perform iterative training on the video recognition network till a preset training completion condition is satisfied.

In addition, the embodiments of this disclosure further provide an electronic device, including the apparatus for recognizing a video or the apparatus for training a video recognition network according to any one of the embodiments of this disclosure.

In addition, the embodiments of this disclosure further provide another electronic device, including:

a memory, configured to store executable instructions; and a processor, configured to communicate with the memory to execute the executable instructions so as to complete operations of the method for recognizing a video or the method for training a video recognition network according to any one of the embodiments of this disclosure.

Figure 10:
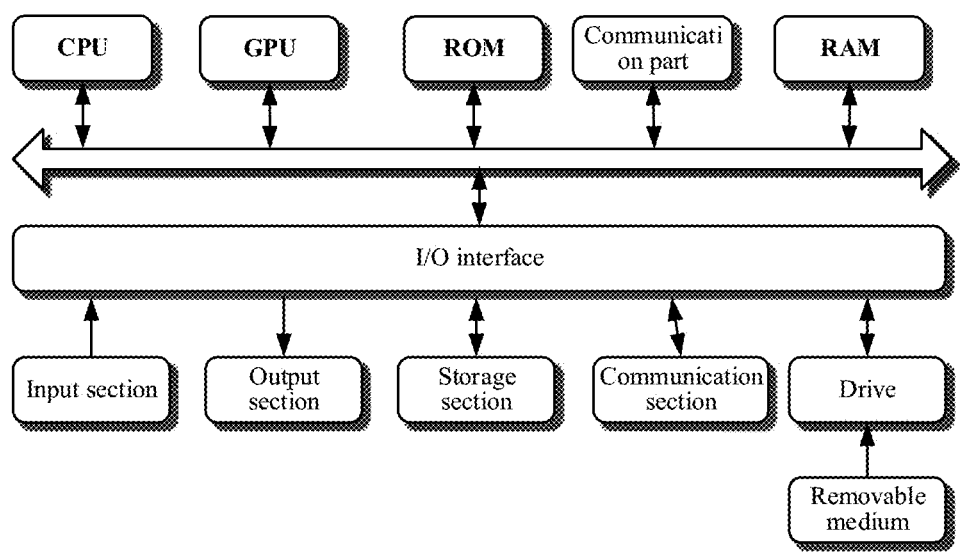
FIG. 10 is a schematic diagram of an application example of an electronic device according to embodiments of this disclosure.

FIG. 10 is a schematic structural diagram of an application example of an electronic device according to embodiments of this disclosure. Referring to FIG. 10 below, FIG. 10 is a schematic structural diagram of an electronic device suitable for implementing a terminal device or a server according to the embodiments of the present application. As shown in FIG. 10, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card. The network card may include, but is not limited to, an Infiniband (IB) network card. The processor may communicate with the ROM and/or the RAM, to execute executable instructions. The processor is connected to the communication part via a bus, and communicates with other target devices via the communication part, thereby implementing corresponding operations of any method provided in the embodiments of the present application. For example, features of a first key frame in a video are extracted; fusion is performed on the features of the first key frame and fusion features of a second key frame in the video to obtain fusion features of the first key frame, where a detection sequence of the second key frame in the video precedes that of the first key frame; and detection is performed on the first key frame according to the fusion features of the first key frame to obtain an object detection result of the first key frame. For another example, features of a current key frame in a video and features of a previous key frame in the video are extracted by using a video recognition network; fusion is performed, by using the video recognition network, on the features of the current key frame and the features of the previous key frame to obtain fusion features of the current key frame, and an optical flow field between a current target frame in the video and the current key frame in the video is obtained, where the current target frame is a frame other than the current key frame in a segment where the current key frame is located; features of the current target frame are obtained by using the video recognition network according to the optical flow field between the current target frame and the current key frame, and the fusion features of the current key frame; the current target frame is detected by using the video recognition network according to the features of the current target frame to obtain an object detection result of the current target frame; and the video recognition network is trained based on a difference between the object detection result of the current target frame and tag information of the current target frame.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to perform corresponding operations of any method according to this disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication part of a network interface card including an LAN card, a modem and the like. The communication part performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium is installed on the storage section according to requirements.

It should be noted that the architecture shown in FIG. 10 is merely an optional implementation. During specific practice, a number and types of the components in FIG. 10 are selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of this disclosure.

In addition, the embodiments of this disclosure further provide a computer storage medium, configured to store computer-readable instructions, where when the instructions are executed, the operations of the method for recognizing a video or the method for training a video recognition network according to any one of the embodiments of this disclosure are implemented.

In addition, the embodiments of this disclosure further provide a computer program, including computer-readable instructions, where when the computer-readable instructions run in a device, a processor in the device executes executable instructions for implementing the operations of the method for recognizing a video or the method for training a video recognition network according to any one of the embodiments of this disclosure.

In an optional implementation, the computer program is a software product, such as a Software Development Kit (SDK) or the like.

In one or more optional implementations, the embodiments of this disclosure further provide a computer program product, configured to store computer-readable instructions, where when the instructions are executed, a computer performs the operations of the method for recognizing a video or the method for training a video recognition network according to any one of the embodiments of this disclosure in any one of possible implementations.

The computer program product is implemented by means of hardware, software, or a combination thereof. In an optional example, the computer program product is embodied as a computer storage medium. In another optional example, the computer program product is embodied as a software product, such as an SDK or the like.

In one or more optional implementations, the embodiments of this disclosure further provide a method for recognizing a video, an apparatus corresponding thereto, an electronic device, a computer storage medium, a computer program, and a computer program product. The method includes: extracting features of a first key frame in a video; performing fusion on the features of the first key frame and fusion features of a second key frame in the video to obtain fusion features of the first key frame, where a detection sequence of the second key frame in the video precedes that of the first key frame; and performing detection on the first key frame according to the fusion features of the first key frame to obtain an object detection result of the first key frame.

In one or more optional implementations, the embodiments of this disclosure further provide a method for training a video recognition network, an apparatus corresponding thereto, an electronic device, a computer storage medium, a computer program, and a computer program product. The method includes: extracting features of a current key frame in a video and features of a previous key frame in the video by using a video recognition network; performing, by the video recognition network, fusion on the features of the current key frame and the features of the previous key frame to obtain fusion features of the current key frame, and obtaining an optical flow field between a current target frame in the video and the current key frame in the video, where the current target frame is a frame other than the current key frame in a segment where the current key frame is located; obtaining, by the video recognition network, features of the current target frame according to the optical flow field between the current target frame and the current key frame, and the fusion features of the current key frame; performing, by the video recognition network, detection on the current target frame according to the features of the current target frame to obtain an object detection result of the current target frame; and training the video recognition network based on a difference between the object detection result of the current target frame and tag information of the current target frame.

Particularly, a process described above with reference to a flowchart according to the embodiments of this disclosure is implemented as a computer software program. For example, the embodiments of this disclosure include a computer program product. The computer program product includes a computer program tangibly included in a machine-readable medium. The computer program includes a program code for performing a method shown in the flowchart. The program code may include instructions for performing operations of the method provided in the embodiments of this disclosure.

In one or more optional implementations, the embodiments of this disclosure further provide a method for recognizing a video, an apparatus corresponding thereto, an electronic device, a computer storage medium, a computer program, and a computer program product. The method includes: a first apparatus sends a video recognition indication to a second apparatus, where the indication causes the second apparatus to perform the method for recognizing a video according to any one of the possible embodiments; and the first apparatus receives an object detection result sent by the second apparatus.

In some embodiments, the video recognition indication is an invocation instruction. The first apparatus instructs, by means of invocation, the second apparatus to perform video recognition. Accordingly, in response to reception of the invocation instruction, the second apparatus performs the operations and/process in any one of the embodiments of the method for recognizing a video.

The embodiments of this disclosure are applied to any video recognition scenarios. For example, during aerial photography of wild animals by an intelligent unmanned aerial vehicle, it is required to recognize the animals in a picture as quickly as possible to implement real-time analysis. However, due to effects of airflow and others, the picture possibly shakes and blurs. In addition, the wild animals also possibly run fast. These factors will lead to a picture having low quality and will cause a failure in a conventional recognition network. By applying the method for recognizing a video according to the embodiments of this disclosure, fusion features of other frames in a video are propagated to a current frame, thereby improving recognition accuracy of a picture having low quality.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in this disclosure are implemented in many manners. For example, the methods and apparatuses in this disclosure are implemented with software, hardware, firmware, or any combination of software, hardware, and firmware. Unless otherwise specially stated, the foregoing sequences of operations of the methods are merely for description, and are not intended to limit the operations of the methods of this disclosure. In addition, in some embodiments, this disclosure may also be implemented as programs recorded in a recording medium. The programs include machine-readable instructions for implementing the methods according to this disclosure. Therefore, this disclosure further covers the recording medium storing the programs for performing the methods according to this disclosure.

The descriptions of this disclosure are provided for the purpose of examples and description, and are not intended to be exhaustive or limit this disclosure to the disclosed form. Many modifications and changes are obvious to a person of ordinary skill in the art. The embodiments are selected and described to better describe a principle and an actual application of this disclosure, and to make a person of ordinary skill in the art understand this disclosure, so as to design various embodiments with various modifications applicable to particular use.

The invention claimed is:

1. A method for recognizing a video, comprising:
   extracting features of a first key frame in the video;
   performing fusion on the features of the first key frame and fusion features of a second key frame in the video to obtain fusion features of the first key frame, wherein a time sequence of detection of the second key frame in the video precedes that of the first key frame; and
   performing detection on the first key frame according to the fusion features of the first key frame to obtain an object detection result of the first key frame,
   wherein the second key frame comprises a previous key frame adjacent to the first key frame in the video; and
   wherein the fusion features of the second key frame are obtained by performing fusion on the features of the second key frame and fusion features of a third key frame in the video with a time sequence of detection preceding that of the second key frame.

2. The method according to claim 1, prior to the performing fusion on the features of the first key frame and fusion features of a second key frame in the video, the method further comprising:
   obtaining an optical flow field between the first key frame and the second key frame; and
   aligning the fusion features of the second key frame with the first key frame according to the optical flow field between the first key frame and the second key frame;
   wherein the performing fusion on the features of the first key frame and fusion features of a second key frame in the video comprises: performing fusion on the aligned fusion features of the second key frame and the features of the first key frame.

3. The method according to claim 1, wherein the performing fusion on the features of the first key frame and fusion features of a second key frame in the video comprises:
   determining a weight coefficient of the features of the first key frame and a weight coefficient of the fusion features of the second key frame; and
   performing fusion on the features of the first key frame and the fusion features of the second key frame according to the weight coefficient of the features of the first key frame and the weight coefficient of the fusion features of the second key frame.

4. The method according to claim 1, further comprising:
   determining whether the first key frame is an initial key frame in the video;
   wherein the operation of performing fusion on the features of the first key frame and fusion features of a second key frame in the video comprises:
   in response to determining that the first key frame is not the initial key frame in the video, performing fusion on the features of the first key frame and the fusion features of the second key frame; and/or
   in response to determining that the first key frame is the first key frame in the video, obtaining an object detection result of the first key frame according to the features of the first key frame.

5. The method according to claim 1, further comprising:
   using an image frame randomly selected from the video as the first key frame; or
   using an image frame selected from the video at an interval of several frames as the first key frame; or
   splitting the video into a plurality of short video sequences, and separately selecting an image frame from each short video sequence as a key frame of each short video sequence, the key frames of the plurality of short video sequences comprising the first key frame; or
   selecting a short video sequence from the video, and using an image frame selected from the selected short video sequence as the first key frame.

6. The method according to claim 1, further comprising:
   obtaining an optical flow field between a first non-key frame and the first key frame;
   obtaining features of the first non-key frame according to the optical flow field between the first non-key frame and the first key frame, as well as the fusion features of the first key frame; and
   performing detection on the first non-key frame according to the features of the first non-key frame to obtain an object detection result of the first non-key frame.

7. The method according to claim 6, wherein after the obtaining an optical flow field between a first non-key frame and the first key frame, the method further comprises:
   aligning the fusion features of the first key frame with the first non-key frame according to the optical flow field between the first non-key frame and the first key frame; and
   wherein the operation of obtaining features of the first non-key frame according to the optical flow field between the first non-key frame and the first key frame, and the fusion features of the first key frame comprises:
   obtaining the features of the first non-key frame according to the optical flow field between the first non-key frame and the first key frame as well as the aligned fusion features of the first key frame.

8. The method according to claim 1, further comprising:
   adjusting network parameter values in the video recognition network based on at least one of the following: based on the difference between the object detection box in the object detection result of the at least one image frame in the video and the position information in the tag information; or based on a difference between the object category corresponding to the object detection box and the category information in the tag information.

9. A non-transitory computer storage medium, having computer-readable instructions stored thereon, wherein execution of the computer-readable instructions by a processor causes the processor to implement the method according to claim 1.

10. A method for training a video recognition network, comprising:
    extracting, using a video recognition network, features of a current key frame in a video sample and features of a previous key frame in the video sample;

performing, using the video recognition network, fusion on the features of the current key frame and the features of the previous key frame to obtain fusion features of the current key frame, and obtaining an optical flow field between a current target frame in the video sample and the current key frame, wherein the current target frame and the current key frame belong to a same segment of the video sample;

obtaining, using the video recognition network, features of the current target frame according to the optical flow field between the current target frame and the current key frame, and the fusion features of the current key frame;

performing, using the video recognition network, detection on the current target frame according to the features of the current target frame to obtain an object detection result of the current target frame; and adjusting network parameter values of the video recognition network based on a difference between the object detection result of the current target frame and tag information of the current target frame.

11. A non-transitory computer storage medium, having computer-readable instructions stored thereon, wherein execution of the computer-readable instructions by a processor causes the processor to implement the method according to claim 10.

12. An apparatus for recognizing a video, comprising:
a processor; and
a memory for storing instructions executable by the processor;
wherein execution of the instructions by the processor causes the processor to implement operations, the operations comprising:
extracting features of a first key frame in the video;
performing fusion on the features of the first key frame and fusion features of a second key frame in the video to obtain fusion features of the first key frame, wherein a time sequence of detection of the second key frame in the video precedes that of the first key frame; and
performing detection on the first key frame according to the fusion features of the first key frame to obtain an object detection result of the first key frame,
wherein the second key frame comprises a previous key frame adjacent to the first key frame in the video; and
wherein the fusion features of the second key frame are obtained by performing fusion on the features of the second key frame and fusion features of a third key frame in the video with a time sequence of detection preceding that of the second key frame.

13. The apparatus according to claim 12, wherein execution of the instructions by the processor causes the processor to implement operations further comprising:
obtaining an optical flow field between the first key frame and the second key frame; and
aligning the fusion features of the second key frame with the first key frame according to the optical flow field between the first key frame and the second key frame;
wherein the operation of performing fusion on the features of the first key frame and fusion features of a second key frame in the video comprises: performing fusion on the aligned fusion features of the second key frame and the features of the first key frame.

14. The apparatus according to claim 12, wherein the operation of performing fusion on the features of the first key frame and fusion features of a second key frame in the video comprises:

determining a weight coefficient of the features of the first key frame and a weight coefficient of the fusion features of the second key frame; and
performing fusion on the features of the first key frame and the fusion features of the second key frame according to the weight coefficient of the features of the first key frame and the weight coefficient of the fusion features of the second key frame.

15. The apparatus according to claim 12, wherein execution of the instructions by the processor causes the processor to implement operations further comprising:
determining whether the first key frame is an initial key frame in the video;
wherein the operation of performing fusion on the features of the first key frame and fusion features of a second key frame in the video comprises:
in response to determining that the first key frame is not the initial key frame in the video, performing fusion on the features of the first key frame and the fusion features of the second key frame; and
in response to determining that the first key frame is the first key frame in the video, obtaining an object detection result of the first key frame according to the features of the first key frame.

16. The apparatus according to claim 12, wherein execution of the instructions by the processor causes the processor to implement operations further comprising:
using an image frame randomly selected from the video as the first key frame; or
using an image frame selected from the video at an interval of several frames as the first key frame; or
splitting the video into a plurality of short video sequences, and separately selecting an image frame from each short video sequence as a key frame of each short video sequence, the key frames of the plurality of short video sequences comprising the first key frame; or
selecting a short video sequence from the video, and using an image frame selected from the selected short video sequence as the first key frame.

17. The apparatus according to claim 12, wherein execution of the instructions by the processor causes the processor to implement operations further comprising:
obtaining an optical flow field between a first non-key frame and the first key frame;
obtaining features of the first non-key frame according to the optical flow field between the first non-key frame and the first key frame, as well as the fusion features of the first key frame; and
performing detection on the first non-key frame according to the features of the first non-key frame to obtain an object detection result of the first non-key frame.

18. The apparatus according to claim 17, wherein execution of the instructions by the processor causes the processor to implement operations further comprising:
aligning the fusion features of the first key frame with the first non-key frame according to the optical flow field between the first non-key frame and the first key frame; and
wherein the operation of obtaining features of the first non-key frame according to the optical flow field between the first non-key frame and the first key frame, and the fusion features of the first key frame comprises:
obtaining the features of the first non-key frame according to the optical flow field between the first non-key frame and the first key frame as well as the aligned fusion features of the first key frame.

19. The apparatus according to claim 12, wherein execution of the instructions by the processor causes the processor to implement operations further comprising:

adjusting network parameter values in the video recognition network based on at least one of the following: based on the difference between the object detection box in the object detection result of the at least one image frame in the video and the position information in the tag information; or based on a difference between the object category corresponding to the object detection box and the category information in the tag information.

20. An apparatus for training a video recognition network, comprising:

a processor; and a memory for storing instructions executable by the processor, wherein execution of the instructions by the processor causes the processor to implement operations, the operations comprising:

extracting features of a current key frame in a video sample and features of a previous key frame; performing fusion on the features of the current key frame and the features of the previous key frame to obtain fusion features of the current key frame, and obtaining an optical flow field between a current target frame in the video sample and the current key frame, wherein the current target frame and the current key frame belong to a same segment of the video sample; obtaining features of the current target frame according to the optical flow field between the current target frame and the current key frame, and the fusion features of the current key frame; and performing detection on the current target frame according to the features of the current target frame to obtain an object detection result of the current target frame; and adjusting network parameter values of the video recognition network based on a difference between the object detection result of the current target frame and tag information of the current target frame.

* * * * *